Nov. 20, 1928.
J. W. HOBBS
1,692,408
ELECTRIC MOTOR
Filed Dec. 9, 1926     2 Sheets-Sheet 2
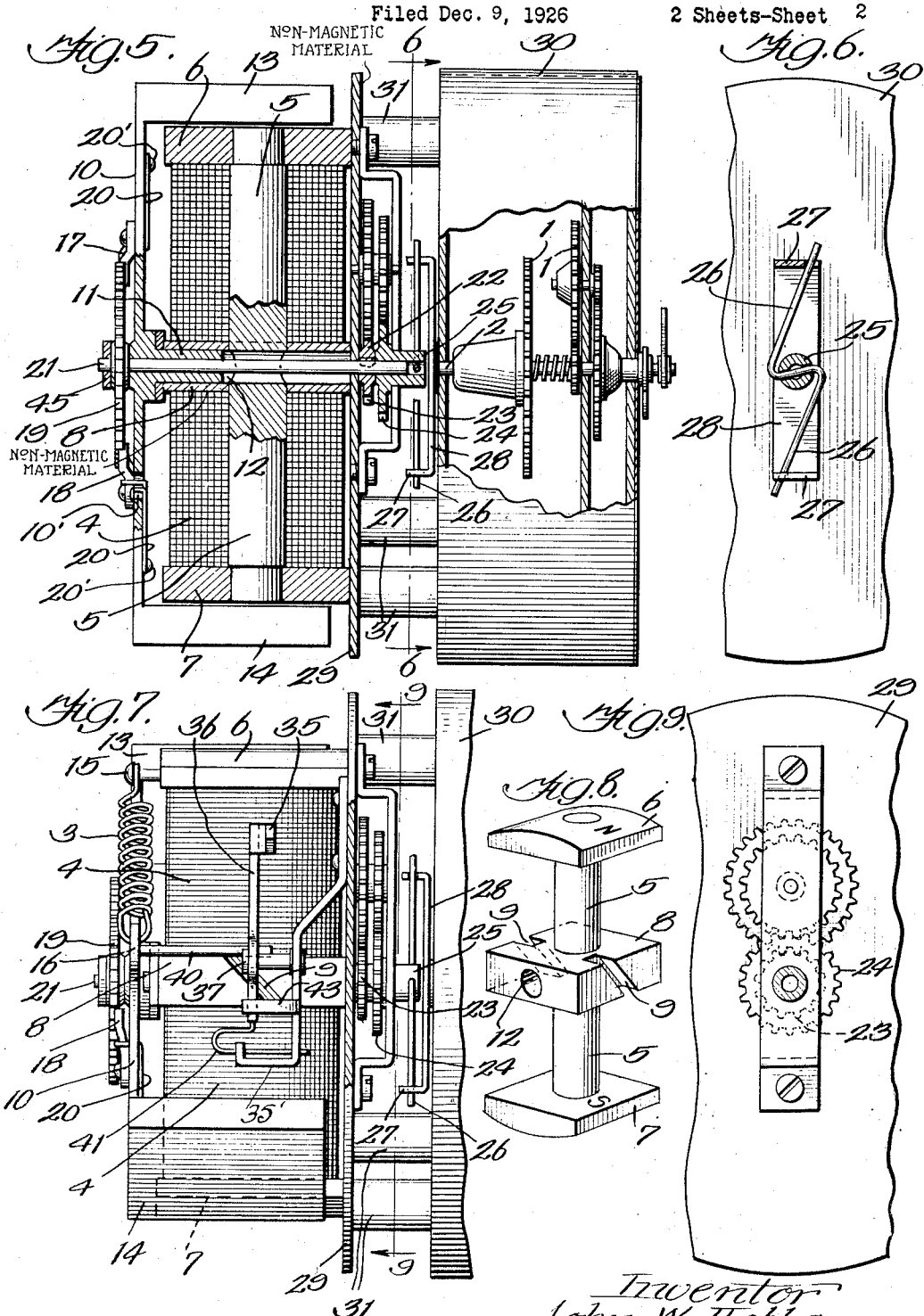

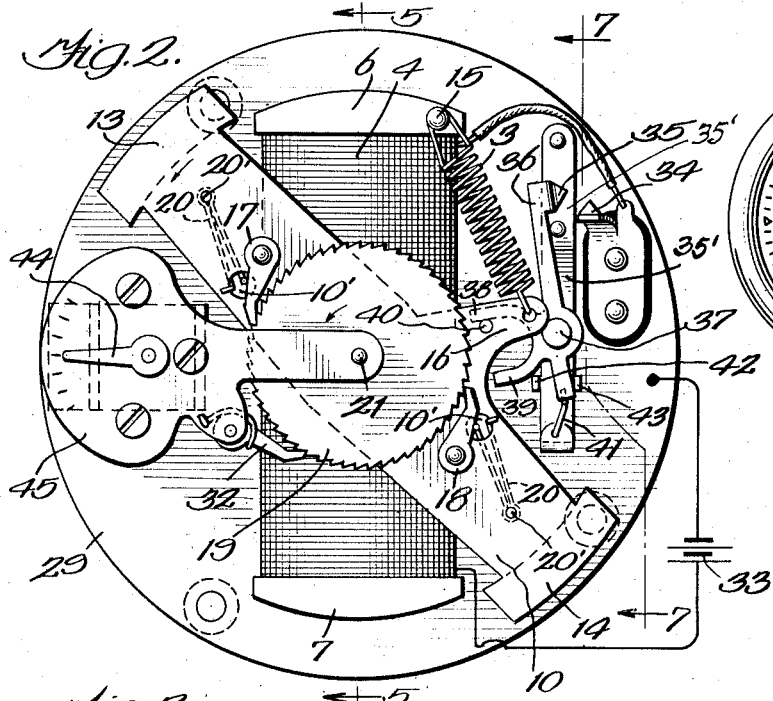

Patented Nov. 20, 1928.

1,692,408

UNITED STATES PATENT OFFICE.

JOHN W. HOBBS, OF MOLINE, ILLINOIS, ASSIGNOR TO GEORGE W. BORG, OF CHICAGO, ILLINOIS.

ELECTRIC MOTOR.

Application filed December 9, 1926. Serial No. 153,577.

My invention, in some of its aspects, relates to mechanism for operating gear trains such, for example, as those employed in clocks and is inclusive of an electric motor which is intermittently operated to replenish power in a main spring which serves to drive the gear train. During each time that the motor is operating to replenish power in the spring, the spring is uncoupled from the gear train.

In accordance with one feature of my invention, a supplemental spring structure is employed for operating the gear train during the time that the first or main spring is uncoupled so that the gear train may be continuously operated as distinguished from the intermittent operation thereof. This supplemental spring structure constitutes one of two complemental rotatable coupling members that are preferably substantially coaxial, one of these coupling members being suitably assembled with the main spring and the other being suitably assembled with the gear train. The supplemental spring structure is inclusive of two spring parts on opposite sides of the axis of this structure, the coupling member complemental to this spring structure including two abutments on opposite sides of the axis thereon and pressed upon in the same circular direction by said spring parts which have power stored therein by the main spring to operate the gear train when the motor is replenishing power in the main spring. In the preferred embodiment of the invention, the aforesaid spring parts are in the nature of oppositely projecting spring arms. These spring arms or spring parts serve to receive and impart uniform torque, side thrusts being eliminated to eliminate lateral wear upon the shafts connected by the coupling members and the bearings for these shafts.

In accordance with another feature of my invention, the field magnet of the motor is cumulatively wound to induce uni-directional magnetic flux through the field magnet core, there being a block of non-magnetizable material assembled with an intermediate portion of the field magnet core and in supporting relation to the motor armature and motion transmitting mechanism operated by the armature. In order that this block may be thus disposed, it is constructed to permit of the uni-directional winding of the field magnet, wire receiving slots being preferably formed in the block which permit the wire to be passed from each side of the block to the other in the winding operation of the field magnet.

The invention also provides delicate spring devices for lightly pressing the pawl or pawls into engagement with the ratchet. Each spring device is formed of spring wire or other elongated spring member which is folded to have a bight at its mid portion at which the spring is anchored, preferably pivotally, one end of the spring engaging an abutment and the other end of the spring engaging the corresponding pawl.

The invention will be more fully explained in connection with the accompanying drawings in which Fig. 1 is a face view of a clock equipped with the mechanism of my invention; Fig. 2 is a rear view showing the operating mechanism for the gear train of the clock, this figure also showing the circuit connections for the motor and the switch governing the circuit of the motor; Fig. 3 is a plan view of the clock and motor mechanism for operating its gear train; Fig. 4 is a view showing another position of the motor governing switch; Fig. 5 is a sectional view on line 5—5 of Fig. 2; Fig. 6 is a sectional view on line 6—6 of Fig. 5; Fig. 7 is a sectional view on line 7—7 of Fig. 2; Fig. 8 is a perspective view illustrating the preferred construction of the core of the field magnet; and Fig. 9 is a sectional view on line 9—9 of Fig. 7.

The electric motor illustrated is inclusive of a stationary field magnet whose winding 4 is disposed about the magnetizable core 5 between the polar extensions 6 and 7 of the core, this winding being directed to induce magnetic flux of one direction in the core, assuming the magnet to be energized by unidirectional current, so that one polar extension 6 has one constant polarity, say north, and the other has an opposite polarity. The winding space between the polar extensions 6 and 7 is divided into two equal parts by a block of brass or other non-magnetic material 8 which has wire receiving slots 9 formed therein which permit of the passage of the wire from one side of the block to the other, during the winding operation in order that such wire may be disposed to magnetize the core as stated.

The movable element of the motor is in the form of an armature 10, in the embodiment of the invention illustrated. This armature is formed with a hub extension 11 which turns within one end of an opening 12 extending through the block that serves as a bearing for the armature. The armature is formed with polar extensions 13 and 14 which project into the zone of the field magnet, the armature being mounted to oscillate and having its range of oscillation limited so that when the polar extensions 13 and 14 are furthest removed from the deenergized field magnet it will be within the range of attraction of the field magnet, when the field magnet is energized. As will hereinafter appear, the main spring 3 functions to operate the gear train of the clock during the time that the field magnet is de-energized and ceases to have this function during each of the short periods when the magnet is energized to replenish power in the spring, such energization of the magnet occurring consequent upon each operation of the clock train by the spring.

The spring may be attached, at one end, to the field magnet pole 6 by means of the pin 15 and is attached, at its other end, to the ear 16 projecting from one side of the armature 10. Two pawls 17 and 18 are pressed into engagement with the ratchet wheel 19 by means of the springs 20, one of these pawls being in full engagement with a ratchet tooth while the other one of these pawls is in partial engagement with another ratchet tooth. While the main spring is functioning to operate the clock train, one or the other of these pawls is in constant full engagement with the ratchet wheel so that the spring in turning the pawls bodily will cause a turning movement of the ratchet wheel which is in driving connection with the clock train. This ratchet wheel is fixed upon a shaft 21 which is journaled, at one end, in the hub extension 11 of the armature 10. The shaft 21 extends through the opening 12 into connection with the hub 22 of a pinion 23 which constitutes the initial member of a motion transmitting gear train whose final wheel 24 has a hub 25. A spring wire 26, of zig-zag form, has its mid portion loosely passing through the hub 25 and its arms extending in opposite directions from the axis of the hub into floating engagement with the abutments 27 which are pressed upon in the same circular direction by said spring arms. The abutments 27 are constituted of the bent ends of a bar 28 which is secured at its mid portion upon the inner end of the initial shaft 2 of the clock train of gears. The shafts 2 and 21 and the hub 25 are desirably substantially coaxial, the inner end of shaft 21 entering and rotatively supporting said hub and, itself, passing through and being journaled upon the non-magnetic plate 29 upon which the field core 5 is fixedly mounted and to which plate the clock casing 30 is secured, this plate and casing being spaced apart by distance pieces 31 to accommodate the motion transmitting gearing through which the main spring drives the spring coupling member 26. During the time that the main spring 3 drives the clock gear train, the spring 26 is placed under increased tension. This increased tension in spring 26 serves to continue the operation of the clock when the armature is moving to replenish power in the then uncoupled main spring, it being understood that the pawls 17 and 18 are then in lost motion relation to the ratchet wheel 19 which is held from reverse rotation by the holding dog 32. When the armature is thus operated, the pawls ride upon the ratchet wheel into ultimate engagement with fresh teeth whereupon the magnet circuit is broken, as will appear, to permit the main spring to function. The pawls being so related that one will have engagement with a half of a tooth while the other has full tooth engagement, the maximum lost motion of the pawls occurring upon the resumption by the spring 3 of its gear train operating function will be limited to half a tooth space. The abutments 27 are pressed upon in the same circular direction by the spring parts 26 to relieve the bearings for the hub 25 and shaft 2 of side thrust. In order that the pawls may be pressed very lightly upon the ratchet wheel, the springs 20 are formed of folded spring wires whose bights are journaled upon the pins 20' carried by the armature, one side of each spring pressing lightly upon the corresponding pawl and the other side engaging an abutment upon the armature. These abutments are formed by holes 10' through the armature, the sides of the springs, which are mounted upon the under side of the armature, having bent ends which pass through said holes, one of the ends of each spring engaging a side of the corresponding hole and the other engaging the corresponding pawl.

The circuit of the magnet includes the energizing battery 33, the stationary switch contact 34, and the movable switch contact 35. The latter contact is mounted upon one end of an arm 36 which is intermediately pivoted at 37 upon the bracket 35' mounted upon plate 29. The arm 36 carries a fork having a long side 38 and a short side 39. The pin 40 upon the armature serves to engage the longer side of the fork each time the main spring has about concluded its gear train operating function, said spring finally serving to cause said pin to turn the fork and the arm carrying the fork sufficiently to engage the contact 35 with the contact 34. The pin 40 positively moves the arm 26 during a portion of its circuit closing movement whereupon the throw-over spring 41 functions to quickly complete the circuit closing movement of said arm. The armature 10 is quickly drawn from its fully released position to its fully attracted position by the magnet and slightly beyond this position due to momentum. During the final portion of this armature movement, the pin 40 engages the shorter side 39 of the fork to quickly separate the contact 35 from the contact 34, the spring 41 maintaining the separation of the switch contacts. The arm 36 may be limited in its movements by the abutments 42 and 43.

The clock train may be equipped with a balance wheel and hair spring, not shown, the tension of the hair spring being regulated by the lever 44 which is journaled upon a plate 45 that is suitably secured to the plate 29, the shaft 21 being desirably passed through one end of the plate 45.

Changes may be made without departing from the invention.

Having thus described my invention, I claim:

1. An electric motor having a moving element and including a field magnet inclusive of a magnetizable core; a block of non-magnetizable material assembled with an intermediate portion of said core and formed with slots on opposite sides thereof and in communication with the winding spaces of the magnet that are spaced apart by said block, an energizing wire winding disposed about said core and passing through said slots and wound in a direction to induce magnetic flux through said core in a single direction; a shaft passing through said block and core; and motion transmitting means between the moving element of the motor and said shaft.

2. An electric motor including a field magnet inclusive of a magnetizable core, said motor also including an armature for said magnet; a block of non-magnetizable material assembled with an intermediate portion of said core and formed with slots on opposite sides thereof and in communication with the winding spaces of the magnet that are spaced apart by said block; an energizing wire winding disposed about said core and passing through said slots and wound in a direction to induce magnetic flux through said core in a single direction; and motion transmitting mechanism operable by the armature and having a portion supported by said block.

3. An electric motor having a moving element and including a field magnet inclusive of a magnetizable core; a block of non-magnetizable material assembled with an intermediate portion of said core; an energizing wire winding disposed about said core and block and wound in a direction to induce magnetic flux through said core in a single direction; a shaft passing through said block and core; and motion transmitting means between the moving element of the motor and said shaft.

4. An electric motor including a field magnet inclusive of a magnetizable core, said motor also including an armature for said magnet; a block of non-magnetizable material assembled with an intermediate portion of said core; an energizing wire winding disposed about said core and block and wound in a direction to induce magnetic flux through said core in a single direction; and motion transmitting mechanism operable by the armature and having a portion supported by said block.

5. An electric motor having a moving element and including a field magnet inclusive of a magnetizable core; a block of non-magnetizable material, on which the moving element of the motor is mounted, assembled with an intermediate portion of said core and formed with slots on opposite sides thereof and in communication with the winding spaces of the magnet that are spaced apart by said block; and an energizing wire winding disposed about said core and passing through said slots and wound in a direction to induce magnetic flux through said core in a single direction.

In witness whereof, I hereunto subscribe my name.

JOHN W. HOBBS.